Sept. 7, 1943.  R. M. LEIPPE  2,328,728
ELECTRICAL MEASURING DEVICE
Filed Sept. 17, 1941

INVENTOR
Richard M. Leippe.
ATTORNEY

Patented Sept. 7, 1943

2,328,728

UNITED STATES PATENT OFFICE 2,328,728

ELECTRICAL MEASURING DEVICE

Richard M. Leippe, Cedar Grove, N. J., assignor to Westinghouse Electric & Manufacturing Company, East Pittsburgh, Pa., a corporation of Pennsylvania Application September 17, 1941, Serial No. 411,149

6 Claims. (Cl. 171—264)

This invention relates to electrical instruments and it has particular relation to temperature compensation of alternating current induction instruments for measuring various electrical quantities.

For response to alternating current quantities such as watts, vars and volt-amperes, it is common practice to employ induction type measuring instruments. These instruments may be relays, indicating instruments, recording instruments or integrating meters. As a specific example of this class of electrical instruments, reference may be made to a watt-hour meter.

In a conventional watt-hour meter, voltage and current windings are employed for producing a magnetic field in an air gap provided in an associated magnetic structure. An electroconductive armature is positioned in the air gap for rotation by the shifting magnetic field.

In order to assure a proper phase relationship between flux produced by the voltage winding which may be termed a "voltage flux," and flux produced by the current windings which may be termed a "current flux," it is the practice to associate with the voltage winding a closed winding which is known as a quadrature or lag loop. When such a watt-hour meter is properly adjusted for operation at a predetermined temperature, it accurately measures the energy flowing through an associated electric circuit.

Because of certain variables such as the temperature coefficients of resistance and permeability of electroconductive and magnetic materials, a watt-hour meter calibrated for a predetermined temperature may operate incorrectly at other temperatures. In conventional watt-hour meters one of the effects of temperature variation is to destroy the proper phase relationship between current and voltage fluxes.

To compensate phase or inductive relationships in a watt-hour meter for temperature changes, various expedients have been adopted. According to one of these expedients a magnetic circuit or path having a negative temperature coefficient of permeability is established around the quadrature or lag loop. When the temperature of a watt-hour meter compensated in this manner varies, the variation in permeability of the magnetic circuit path is in such a direction as to maintain the proper phase relationship between the voltage and current fluxes.

For various reasons such as variations in materials and variations resulting from manufacturing tolerances, a quadrature or lag loop proportioned for one watt-hour meter may be improperly proportioned for another watt-hour meter. In the prior art, no satisfactory method for adjusting a fixed quadrature or lag loop to a specific watt-hour meter has been available. Consequently the meter manufacturer has been forced to adopt a "cut and try" method of fitting a quadrature and lag loop to a watt-hour meter, or he has resigned himself to the errors resulting from the utilization of a fixed quadrature or lag loop.

In accordance with the invention, an adjustable magnetic circuit or path is provided for magnetic flux produced by current flowing through a quadrature or lag loop. By a suitable adjustment of the reluctance of the magnetic circuit or path the quadrature or lag loop correction may be varied to suit individual watt-hour meters. Moreover, if a portion of the material employed in the magnetic circuit or path possesses a negative temperature coefficient of permeability, a single magnetic circuit or path serves not only for adjustment purposes but for inductive temperature compensation.

It is therefore an object of the invention to provide a watt-hour meter that may be readily calibrated.

It is a further object of the invention to provide an adjustable magnetic circuit or path for magnetic flux produced by current flowing through the quadrature or lag loop of a watt-hour meter.

It is a still further object of the invention to provide a watt-hour meter having an adjustable magnetic circuit or path for magnetic flux produced by current flowing through the quadrature or lag loop of the watt-hour meter and having a portion of the magnetic circuit or path formed of a material suitable for compensating the watt-hour meter for temperature responsive variations in phase relationships.

Other objects of the invention will be apparent from the following description taken in conjunction with the accompanying drawing in which.

Figure 1:
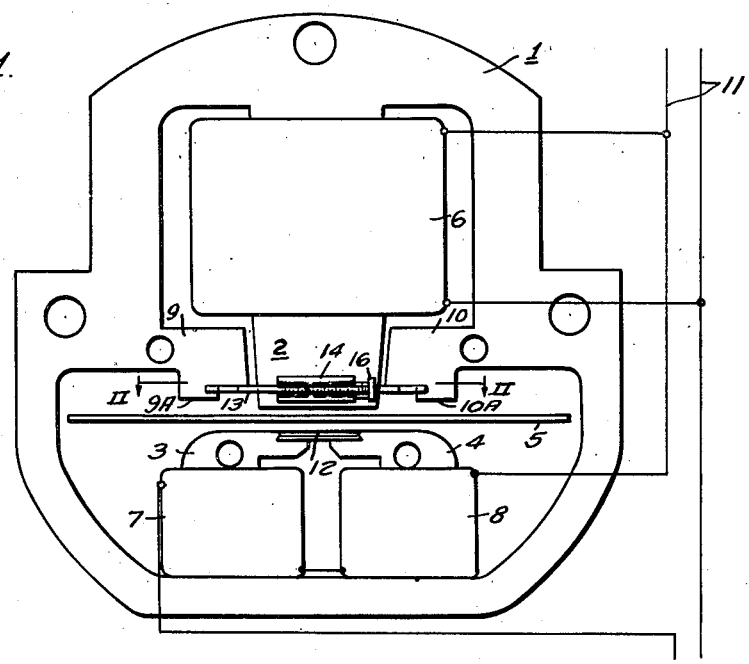
Figure 1 is a view in front elevation of a watt-hour meter embodying the invention.

Referring to the drawing, Fig. 1 shows an alternating current instrument which, for the purpose of illustration, is assumed to be a watt-hour meter. This watt-hour meter includes a magnetic core 1 which, in accordance with standard practice, may be formed of a plurality of laminations of soft steel or iron. The magnetic core 1 includes a voltage pole 2 and current poles 3 and 4 which are positioned to define an air gap within which an electroconductive armature or disk 5 is mounted for rotation. Magnetic flux which may be termed a voltage flux is produced in the voltage pole 2 by means of a voltage winding 6. Similarly magnetic flux which may be termed a current flux is produced in the current coils 3 and 4 by means of current windings 7 and 8. These current windings 7 and 8 may be connected in series and reversely related so that the instantaneous direction of current flux flow is downwardly in one of the current poles and upwardly in the remaining current pole.

By inspection of Fig. 1, it will be observed that the magnetic core 1 includes projections 9 and 10 which are separated from the voltage pole 2 by small air gaps. Because of this construction, the magnetic circuit for the voltage winding 6 assures a high inductance for the winding.

As well understood in the art, voltage flux produced by the voltage winding 6 may be divided into a first portion which passes from the voltage pole 2 across the air gap to the current poles 3 and 4. The remainder of the voltage flux passes through the projections 9 and 10. A portion of the current flux passes between the current poles 3 and 4 through the air gap wherein the flux cuts the armature 5. Additional current flux passes between each of the current poles 3 and 4 and a depending portion 9A or 10A of the corresponding projection 9 or 10.

Typical connections for the windings of the watt-hour meter are illustrated in Fig. 1. For example, the voltage winding 6 may be connected for energization in accordance with the voltage of an electrical alternating current circuit 11. The current windings 7 and 8 may be connected in series for energization in accordance with current flowing through the circuit 11.

Since the current windings 7 and 8 are energized in accordance with current flowing in the circuit 11, the current flowing in the windings 7 and 8 and the flux produced in the current coils 3 and 4 by such current are substantially in phase with the current flowing in the circuit 11. However, the voltage flux produced in the voltage pole 2 by the current flowing in the voltage coil 6 is not in phase with voltage applied to the voltage winding 6. This is for the reason that the voltage winding 6 has a large number of turns and is associated with a magnetic circuit formed by portions of the magnetic core 1 which provide a high inductive reactance for the voltage winding 6. For this reason the current flowing through the voltage winding 6 and the voltage flux produced by such current lags substantially behind the voltage applied to the voltage winding 6. Consequently, if the circuit 11 is operating at unity power factor, the voltage and current fluxes in the magnetic core 1 are substantially out of phase.

Because of the phase and space displacements of the voltage and current fluxes a shifting magnetic field is produced in the air gap within which the armature 5 is positioned. As well understood in the art, such a shifting magnetic field produces a torque acting on the armature 5 to produce rotation thereof. In accordance with standard practice, a damping magnet (not shown) may be provided for damping rotation of the armature 5. Also, a saturating conventional magnetic shunt 12 may be installed between the current poles 3 and 4 for compensating for the series damping produced in the armature 5 by the current flux. A portion of the current flux passes between the current poles 3 and 4 through the shunt 12.

As previously pointed out, the voltage flux produced by the voltage winding 6 lags substantially the voltage applied to the voltage winding 6. However, the voltage flux is not exactly in quadrature with the voltage applied to the voltage winding 6. This is for the reason that the voltage winding 6 possesses some resistance which makes the angle of lag of the voltage flux somewhat less than 90° behind the voltage applied to the winding.

Proper phase relationship between the voltage and current fluxes is provided by a closed winding 13 of one or more turns which is positioned to enclose a portion of the voltage flux which passes through the air gap containing the armature 5. In the specific example of Fig. 1 it will be assumed that the closed winding 13, which is known as a quadrature or lag loop, consists of one turn. Conveniently this lag loop may be formed by cutting or punching a single turn from a sheet of electroconductive material such as copper or bronze.

The lag loop 13 operates somewhat similarly to a closed secondary winding of a transformer wherein the primary winding consists of the voltage winding 6. The voltage flux which passes through the lag loop 13 induces a voltage in the closed lag loop which, in turn, forces a current around the lag loop. Since the lag loop 13 provides an impedance which is substantially resistant, current flowing through the lag loop is substantially in phase with the voltage induced therein. The phase relationship of magnetic flux produced by current flowing through the lag loop 13 to the voltage flux which passes through the lag loop is such that the resulting flux which passes into the air gap containing the armature 5 may be brought into quadrature with the voltage across the voltage winding 6.

By proper proportioning of the lag loop 13, as previously explained, the voltage and current fluxes in the air gap may be brought into exact quadrature when the circuit 11 operates at unity power factor, and into exact phase with each other when the circuit 11 operates at zero power factor. For intermediate power factors, the phase relationship between the current and voltage fluxes will have the correct value. This relationship of magnetic fluxes is correct, however, for only a predetermined temperature.

In practice, it is found necessary to employ materials which have substantial temperature coefficients of resistance and sometimes of permeability. For example, the voltage winding 6 customarily is formed of a large number of turns of fine copper wire. Since copper wire has a substantial positive temperature coefficient of resistance, it follows that as the temperature of the watt-hour meter rises, the resistance of voltage winding 6 also increases. The increase of resistance of the voltage winding decreases the angle of lag of current flow in the voltage winding with relationship to voltage applied to the voltage winding. Such a variation destroys the quadrature relationship between voltage and current fluxes in the air gap containing the armature 5 when the circuit 11 operates at unity power factor.

If the temperature of the watt-hour meter increases above the predetermined value for which the watt-hour meter is calibrated, it is necessary that the lag loop 13 produce an increased lagging effect if the proper phase relationship between voltage and current fluxes is to be maintained. However, the quadrature or lag loop 13 generally is formed of copper or bronze which have positive temperature coefficients of resistance. Consequently, as the temperature of the watt-hour meter increases the resistance of the lag loop 13 also increases, and a current flowing therethrough consequently decreases. For this reason, the lagging effect of the lag loop 13 decreases with an increasing temperature which is opposite to the effect required to maintain proper calibration of the watt-hour meter.

To maintain proper calibration of the watt-hour meter over a wide range of temperature, a magnetic path or circuit having a negative temperature coefficient of permeability may be provided for magnetic flux produced by current flowing in the lag loop 13. Such a magnetic path or circuit increases the inductance of the lag loop 13 somewhat at low temperatures. As the temperature of the watt-hour meter increases, the permeability of the magnetic path or circuit provided around the lag loop 13 decreases. The resulting increase in the reluctance of the magnetic path or circuit reduces the inductance of the lag loop 13 and permits a larger current to flow therethrough for a fixed induced voltage. The increase in current increases the lagging effect of the lag loop 13 which is desired to maintain proper phase relationships between the voltage and current fluxes as the temperature of the watt-hour meter increases. Consequently, by proper proportioning of the lag loop 13 and the magnetic path or circuit therefor, the desired phase relationship between current and voltage fluxes may be maintained over a large temperature range.

The structure shown in Fig. 1 which has thus far been described in detail is well known in the art. Consequently a further description of its operation is believed unnecessary.

In the construction of watt-hour meters, various factors affect the final calibration thereof. For example, variations in the electrical or magnetic properties of the materials employed in the watt-hour meter and variations in dimensions resulting from manufacturing tolerances contribute to a slight variation in the resulting performance of the watt-hour meter. In the prior art constructions, the fixed nature of the lag loop 13 and of the associated magnetic path having a negative temperature coefficient of permeability precluded a convenient calibration to compensate for the aforesaid manufacturing variations.

In order to permit calibration of a watt-hour meter, a lag loop 13 is provided with a magnetic circuit or path which may be conveniently adjusted. This magnetic path may take the form of a block 14 of magnetic material having slot 15 for the reception of an arm of the lag loop 13. The magnetic path or circuit may be completed by a machine screw 16 which is in threaded engagement with threads 17 provided adjacent the external end of the slot 15. By inspection of the drawing, it will be observed that the screw 16 serves to bridge the open end of the slot 15. The extent of the bridging action of the screw 16 is determined by the extent to which the screw 16 is introduced into the slot 15. This extent is readily controlled by rotation of the screw 16 to advance or remove it relative to the block 14.

By proper control of the materials employed for the screw 16 and the block 14, various effects may be obtained. For example, if the block 14 and the screw 16 are both formed of a magnetic material such as soft iron having substantially a zero temperature coefficient of permeability, adjustment of the screw 16 merely varies the impedance of the loop 13. Such variation in impedance may be employed for varying the lagging effect of the loop 13 to calibrate the watt-hour meter. As previously explained, an increase in the impedance in the loop 13 increases its lagging effect.

If either the block 14 or the screw 16, or both of these elements, are formed of a magnetic material having a negative temperature coefficient of permeability, the magnetic circuit or path formed by the block and the screw serves to compensate the watt-hour meter for variations in phase between the voltage and current fluxes resulting from changes in temperature. At the same time adjustment of the screw 16 relative to the block 14 serves to calibrate the watt-hour meter to compensate for variations in phase displacements between current and voltage fluxes resulting from variations in materials or dimensions.

In a preferred embodiment of the invention, the block 14 is constructed of a material having a negative temperature coefficient of permeability. Such material is well known in the art and may be formed of a well known nickel-iron alloy having 30% nickel and suitably heat treated. In this embodiment, the screw 16 is formed of a material having a small or no temperature coefficient of permeability, such as a suitable soft iron or mild steel. With such a construction an adequate range of adjustment is provided.

Figure 4:
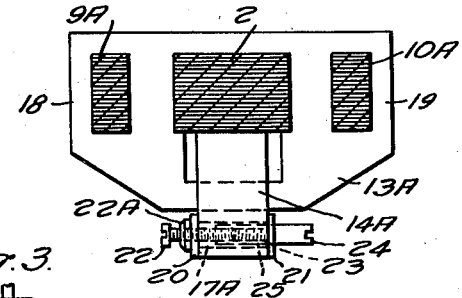
Fig. 4 is a plan view showing a modification of the structure shown in Fig. 2.

In Fig. 4 a somewhat modified construction is shown. This construction includes a quadrature or lag loop 13A which is somewhat similar to the lag loop 13 of Figs. 1 and 2. The lag loop 13A includes additional loops 18 and 19 which surround the depending portions 9A and 10A of the projections 9 and 10. Since the projections 9A and 10A carry current flux, the lag loop 13A serves not only to lag the voltage flux flowing through the tip of the voltage pole 2, but it also serves to lag the current flux flowing through the depending portions 9A and 10A. Consequently, the additional loops 18 and 19 may be designed to cooperate in providing adequate inductive temperature compensation for the meter.

The lag loop 13A also includes a magnetic path or circuit having a block 14A which corresponds to the block 14. This block 14A, if desired, may abut the voltage pole 2. In this position of the block 14A the iron of the voltage pole 2 may form a part of the magnetic circuit or path defined by the block 14A.

Figure 2:
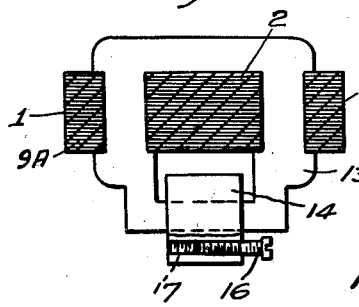
Fig. 2 is a detail view taken along the line II—II of Fig. 1.
Figure 3:
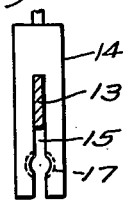
Fig. 3 is a view in side elevation of a portion of the structure shown in Fig. 2.

The block 14A is similar to the block 14 except that the block 14A is provided with a smooth bore 17A instead of the threaded bore 17 of Figs. 2 and 3. At each end of the bore 17A, the block 14A is provided with a suitable non-magnetic disk which is conveniently formed of brass. One of these disks 20 is threaded for the reception of a machine screw 22 which conveniently may be of a non-magnetic material such as brass. A lock nut 22A is provided for the machine screw 22. The remaining disk 21 is provided with a centrally disposed opening 23 for the reception of a magnetic rod 24 having a threaded opening 25 at one end for the reception of the machine screw 22. By rotation of the rod 24 relative to the screw 22, the rod 24 may be advanced or withdrawn relative to the block 14. The disks 20 and 21 may be attached to the block 14A in any suitable manner as by soldering. Alternatively the machine screw 22 may be rigidly attached to the magnetic rod 24. Rotation of the rod and machine screw as a unit then serves to adjust the rod relative to the threaded disk 20.

As in the case of Fig. 2, the block 14A and the rod 24 may be both of soft iron having a low temperature coefficient of permeability, or both may be of an alloy having a high temperature coefficient of permeability. In a preferred embodiment, however, the block 14A is formed of a magnetic material having a high temperature coefficient of a permeability such as the well known nickel-iron alloy, and the rod 24 is formed of a soft iron or mild steel having little or no temperature coefficient of permeability.

If desired, the rod 24 may be substantially in contact with the block 14A. However, a somewhat greater range of adjustment is obtained if the block 24 is spaced slightly from the block 14A. This spacing may be obtained by forming the rod 24 somewhat smaller in diameter than the diameter of the bore 17A. The opening 23 in the disk 21 is adjusted to receive snugly the rod 24 and to space the rod 24 from the walls of the bore 17A.

Although the invention has been described with reference to certain embodiments thereof, numerous modifications are possible. Therefore the invention is to be restricted only by the appended claims.

I claim as my invention:

1. In an alternating current responsive instrumentality, an electromagnet unit comprising a magnetic structure, means for producing a first magnetic flux in said magnetic structure, means for producing a second magnetic flux in said magnetic structure and means for establishing a predetermined phase relationship between said magnetic fluxes, said last-named means including an electroconductive closed winding positioned to surround a portion of said magnetic fluxes for varying the phase relationship of said portion of said magnetic fluxes relative to the remainder thereof, and adjustable means establishing a magnetic path for magnetic flux produced by current flowing in said closed winding, said last-named means including relatively movable magnetic parts for adjusting the magnetic reluctance of said magnetic path, said adjustable means comprising elements for producing relative movement between said magnetic parts.

2. In an alternating current responsive instrumentality, an electromagnet unit normally subject to a temperature error, said electromagnet comprising a magnetic structure having an air gap, means associated with said magnetic structure for producing a shifting magnetic field in said air gap, said means including voltage and current windings for producing, respectively, voltage and current responsive magnetic fluxes in said magnetic structure, and means for maintaining a phase relationship between said magnetic fluxes bearing a predetermined relation to the energization of said windings, said last-named means including an electroconductive closed winding positioned to surround a part of said magnetic fluxes for varying the phase relationship thereof relative to the remainder of said magnetic fluxes, and means compensating said temperature error, comprising means having relatively movable magnetic parts for establishing a magnetic path for magnetic flux produced by current flowing in said closed winding, said last-named means including magnetic material having a substantial temperature coefficient of permeability designed to compensate for the normal temperature error of said electromagnet unit, and adjusting means operable for adjusting the reluctance of said magnetic path, said adjusting means comprising means for producing relative movement between said magnetic parts.

3. In an alternating current measuring instrumentality, an electromagnet unit comprising a magnetic structure having an air gap, an electroconductive armature mounted for rotation in said air gap, a voltage winding for producing a magnetic flux in said magnetic structure and air gap, a current winding for producing a magnetic flux in said magnetic structure and air gap, said magnetic fluxes cooperating to produce a shifting magnetic field in said air gap for rotating said armature, and an electroconductive closed winding positioned to enclose at least part of one of said magnetic fluxes for establishing a resultant predetermined phase relationship between said magnetic fluxes in said air gap for any given energization of said windings, said phase relationship normally being subject to a temperature error dependent on the materials employed for said electromagnet unit, and means for maintaining said predetermined phase relationship over a substantial temperature range, said last-named means comprising relatively movable magnetic parts, including material having a negative temperature coefficient of permeability, establishing a magnetic path for magnetic flux produced by current flowing in said closed winding, and manually operable adjusting means for adjusting the reluctance of said magnetic path, said adjusting means comprising means for producing relative movement between said magnetic parts.

4. In an alternating current induction measuring instrumentality of the type comprising an electromagnet unit, said unit including a magnetic structure having an air gap, an electroconductive armature mounted for rotation in said air gap, a voltage winding for producing a magnetic flux in said magnetic structure and air gap, a current winding for producing a magnetic flux in said magnetic structure and air gap, said magnetic fluxes cooperating to produce a shifting magnetic field in said air gap for rotating said armature, and an electroconductive closed winding positioned to enclose at least part of one of said magnetic fluxes for establishing a resultant predetermined phase relationship between said magnetic fluxes in said air gap for any given energization of said windings, said phase relationship normally being subject to a temperature error dependent on the materials employed for said electromagnet unit; temperature compensating means for maintaining said predetermined phase relationship over a substantial temperature range, said temperature compensating means including a magnetic circuit for magnetic flux produced by current flowing in said closed winding, said magnetic circuit including a pair of relatively movable magnetic portions adjustable for varying the reluctance of said magnetic circuit, at least one of said portions including magnetic material having a negative temperature coefficient of permeability.

5. In an alternating current inductance measuring instrumentality of the type comprising an electromagnet unit, said unit including a magnetic structure having an air gap, an electroconductive armature mounted for rotation in said air gap, a voltage winding for producing a magnetic flux in said magnetic structure and air gap, a current winding for producing a magnetic flux in said magnetic structure and air gap, said magnetic fluxes cooperating to produce a shifting magnetic field in said air gap for rotating said armature, and an electroconductive closed winding positioned to enclose at least part of one of said magnetic fluxes for establishing a predetermined phase relationship between said magnetic fluxes in said air gap for any given energization of said windings, said phase relationship normally being subject to a temperature error dependent on the materials employed for said electromagnet unit; temperature compensating means for maintaining said predetermined phase relationship over a substantial temperature range, said temperature compensating means including a magnetic circuit for magnetic flux produced by current flowing in said closed winding, said magnetic circuit including a pair of relatively movable magnetic portions adjustable for varying the reluctance of said magnetic circuit, said magnetic portions being spaced from each other by a non-magnetic gap, and screw means for moving one of said portions relative to the other of said portions, at least one of said portions including magnetic material having a negative temperature coefficient of permeability.

6. In an alternating current measuring device, an electromagnet unit comprising a magnetic structure having an air gap, means associated with said magnetic structure for producing a shifting magnetic field in said air gap, said means including a voltage winding for producing a first magnetic flux in said air gap, and a current winding for producing a second magnetic flux in said air gap, and means for maintaining a phase relationship between said magnetic fluxes bearing a predetermined relation to the energization of said windings, said last-named means including an electroconductive member having a first portion surrounding at least part of said first magnetic flux, said electroconductive member having a second portion surrounding at least part of said second magnetic flux, and means establishing a substantially closed magnetic path for magnetic flux produced by current flowing in said electroconductive member, said magnetic path comprising a plurality of relatively movable magnetic parts for adjusting the magnetic reluctance of said magnetic path, said magnetic path including magnetic material having a substantial negative temperature coefficient of permeability.

RICHARD M. LEIPPE.